United States Patent [19]

Furudate

[11] Patent Number: 4,918,577
[45] Date of Patent: Apr. 17, 1990

[54] ILLUMINATION LIGHT TRANSMITTING DEVICE

[75] Inventor: Mitsuru Furudate, Furukawa, Japan

[73] Assignee: Alps Electric Co., Ltd., Tokyo, Japan

[21] Appl. No.: 244,887

[22] Filed: Sep. 15, 1988

[30] Foreign Application Priority Data

Jan. 16, 1988 [JP] Japan ................................. 63-3935[U]

[51] Int. Cl.$^4$ .............................................. F21V 7/04
[52] U.S. Cl. ....................................... 362/31; 362/26; 362/330
[58] Field of Search ....................... 362/26, 30, 31, 23, 362/307, 311, 333

[56] References Cited

U.S. PATENT DOCUMENTS

| | | | |
|---|---|---|---|
| 3,223,833 | 12/1965 | Protzmann | 362/26 |
| 4,257,084 | 3/1981 | Reynolds | 362/31 |
| 4,323,951 | 4/1982 | Pasco | 362/26 |
| 4,714,983 | 12/1987 | Lang | 362/31 X |
| 4,729,185 | 3/1988 | Baba | 362/31 X |

FOREIGN PATENT DOCUMENTS

| | | | |
|---|---|---|---|
| 696000 | 10/1964 | Canada | 362/26 |
| 952388 | 3/1964 | United Kingdom | 362/31 |

OTHER PUBLICATIONS

"Piping Light With Acrylic Materials", Henry Pearson, Modern Plastics, Aug. 1946, p. 127.

*Primary Examiner*—Ira S. Lazarus
*Assistant Examiner*—Peggy Neils
*Attorney, Agent, or Firm*—Guy W. Shoup; Stephen L. Malaska; Paul J. Winters

[57] ABSTRACT

An illumination light transmitting device comprising a rectangular illumination light transmitting body and a light source disposed outside an illumination range of the body or at an end portion of the body. The body has an illuminating portion formed with an oblique surface at the other end portion of the body on the opposite side of the light source. The oblique surface is formed with plural curved grooves. The light from the light source is transmitted through the body and is reflected on the curved grooves in various directions, thereby ensuring uniform illumination with effective irregular reflection.

1 Claim, 1 Drawing Sheet

ILLUMINATION LIGHT TRANSMITTING DEVICE

BACKGROUND OF THE INVENTION

The present invention relates to an illumination light transmitting device to be installed in an on-vehicle electrical equipment such as a heater control unit and adapted to illuminate a radio, for example, to be arranged under the heater control unit, and more particularly to an illumination light transmitting device suitable for the case where an illumination light source is obliged to be located at an extreme end of an illumination range.

FIG. 2 shows a conventional illumination light transmitting device. Reference numeral 2 designates an illumination light transmitting body having an illuminating portion 2a formed with plural sawtoothed grooves 2e. The illumination light transmitting body 2 is provided in a case 1 forming a part of a front panel A of a heater control unit. The case 1 defines a substantially L-shaped space therein having at one end thereof a holder portion 1a for receiving a light source 3.

The illumination light transmitting body 2 is formed of a material having a good light transmittance such as glass and acrylic resin, and it is formed in a rectangular shape. The illumination light transmitting body 2 has a light receiving portion 2b at one end portion thereof disposed near and opposite to the light source 3 received in the holder portion 1a of the case 1. The light receiving portion 2b is formed with a light reflecting surface 2c for reflecting the light from the light source 3 and transmitting the reflected light into the illumination light transmitting body 2. The illuminating portion 2a is formed at the other end portion of the illumination light transmitting body 2, and it is formed with an oblique surface 2d substantially parallel to the light reflecting surface 2c. The oblique surface 2d of the illuminating portion 2a is formed with the sawtoothed grooves 2e for reflecting the light transmitted through the illumination light transmitting body 2 toward an opening portion 5 of the front panel A through a color board 4 covering the opening portion 5 to an objective body 6 to be illuminated.

However, in the conventional illuminating construction wherein the light transmitted through the illumination light transmitting body 2 is reflected by the sawtoothed grooves 2e to illuminate the objective body 6, the light reflected by the light reflecting surface 2c is repeatedly reflected with irregular reflection on an upper surface 2f and a lower surface 2g of the illumination light transmitting body 2 until it reaches the oblique surface 2d of the illuminating portion 2a. Therefore, the light enters the sawtoothed grooves 2e at complex incident angles. Thus, as the light with the complex incident angles is reflected by the flat surfaces of the sawtoothed grooves 2e, the effect of the irregular reflection causes a lack of uniform illumination and less light quantity at a position far away from the light source 3.

SUMMARY OF THE INVENTION

It is an object of the present invention to provide an illumination light transmitting device which may effectively generate irregular reflection of light transmitted from the light source and thereby ensure uniform illumination.

According to the present invention, there is provided an illumination light transmitting device comprising a rectangular illumination light transmitting body and a light source disposed outside an illumination range of said body or at an end portion of said body, said body having an illuminating portion formed with an oblique surface at the other end portion of said body on the opposite side of said light source, said oblique surface being formed with plural curved grooves.

With this arrangement, the light emitted from the light source and transmitted through the illumination light transmitting body is irregularly reflected in various directions by the plural curved grooves formed at the oblique surface of the illumination light transmitting body, thereby ensuring uniform illumination.

Other objects and features of the invention will be more fully understood from the following detailed description and appended claims when taken with the accompanying drawings.

DETAILED DESCRIPTION OF THE PREFERRED EMBODIMENT

Figure 1:
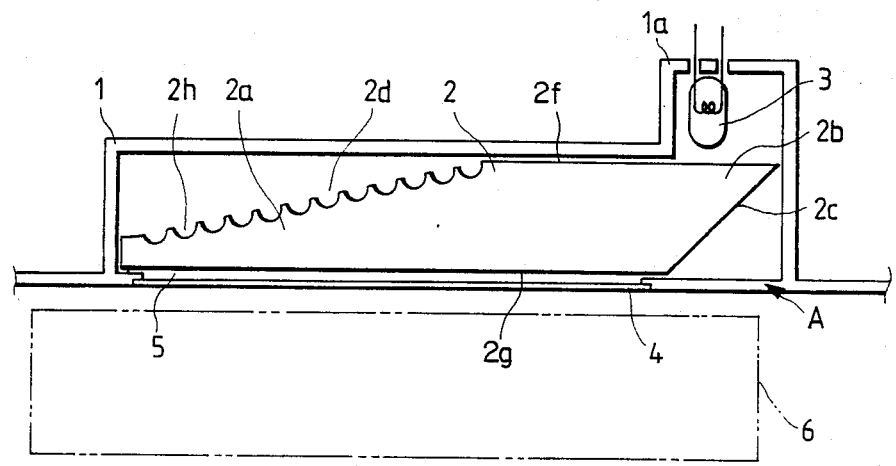
FIG. 1 is a horizontally sectional plan view of the illumination light transmitting device according to the present invention.
Figure 2:
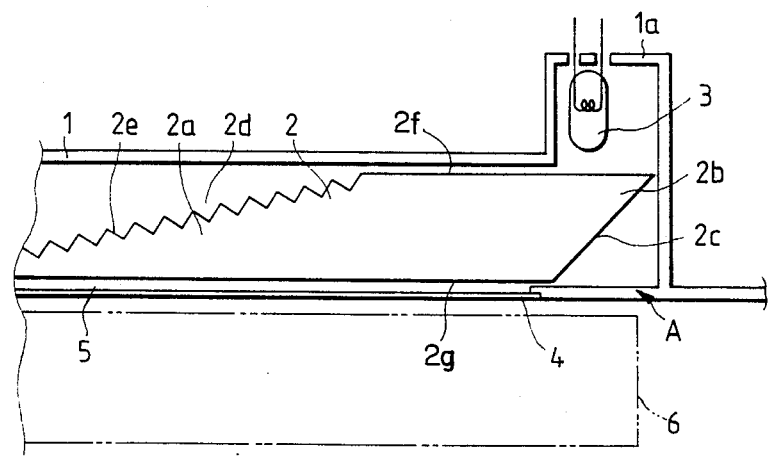
FIG. 2 is a horizontally sectional plan view of the illumination light transmitting device in the prior art.

Referring to FIG. 1 which shows a preferred embodiment of the present invention, reference numeral 1 designates a case forming a part of a front panel A of a heater control unit, for example. There are installed in the case 1 an illumination light transmitting body 2 and a light source 3. The illumination light transmitting body 2 is formed of a material having a good light transmittance such as glass and acrylic resin. The case 1 is formed with an opening portion 5 covered with a color board 4 formed of a light transmitting material including a coloring matter. Reference numeral 6 designates an objective body such as a radio to be illuminated. As the above construction is substantially the same as the conventional construction as previously mentioned, the explanation of the function will be omitted.

The illumination light transmitting body 2 has an illuminating portion 2a constituting an essential part of the present invention, which portion 2a is formed with plural semi-circular grooves 2h instead of the plural sawtoothed grooves 2e in the prior art. The light emitted from the light source 3 is reflected on a light reflecting surface 2c of a light receiving portion 2b of the illumination light transmitting body 2, and is transmitted with irregular reflection through the illumination light transmitting body 2 to the illuminating portion 2a. The light reaching the oblique surface 2d of the illuminating portion 2a is reflected in various directions by the plural semi-circular grooves 2h owing to the curved surfaces of the grooves 2h. That is, as compared with the flat surfaces of the sawtoothed grooves 2e in the prior art, the curved surfaces of the semi-circular grooves 2h enable the light to be reflected in more directions. Accordingly, nonuniform illumination generated by the sawtoothed grooves 2e can be eliminated, and uniform illumination is ensured with effective irregular reflection of light.

While the invention has been described with reference to a specific embodiment, the description is illustrative and is not to be construed as limiting the scope of the invention. Various modifications and changes may occur to those skilled in the art without departing from the spirit and scope of the invention as defined by the appended claim.

What is claimed is:

1. An illumination light transmitting device comprising:
an external light source; and
a rectangular illumination light transmitting body having an upper portion including a substantially flat surface and a surface positioned so as to form an oblique angle with said flat surface and having a plurality of curved grooves formed therein, a lower portion having a substantially flat surface, and a light reflective side surface; wherein said external light source is disposed opposite said flat surface of said upper portion and light from said external light source is reflected by said side surface onto said surface having a plurality of curved grooves formed therein.

* * * * *